June 11, 1929.  A. MUELLER  1,716,597
AIRSHIP
Original Filed Aug. 24, 1925  2 Sheets-Sheet 2
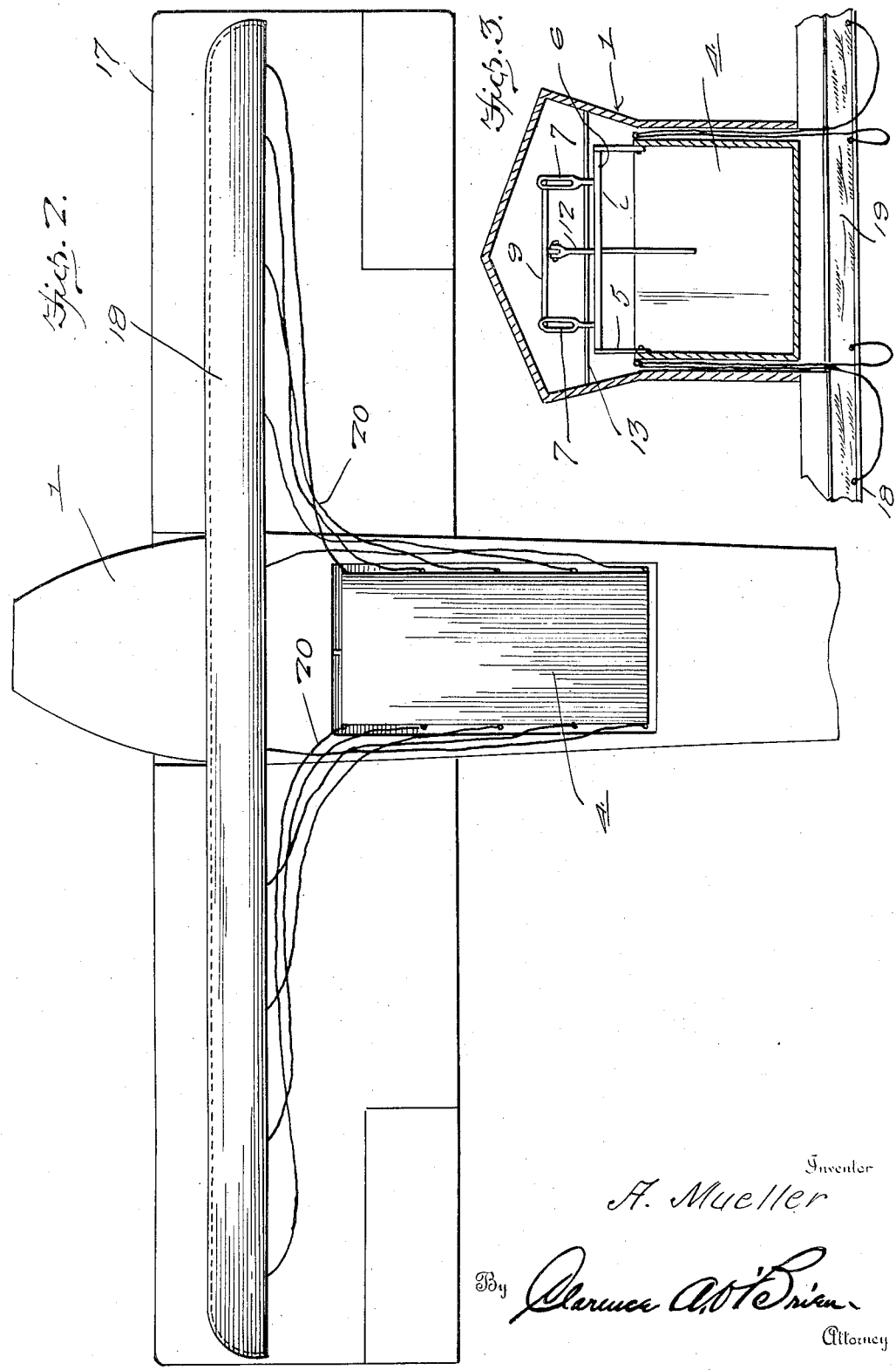

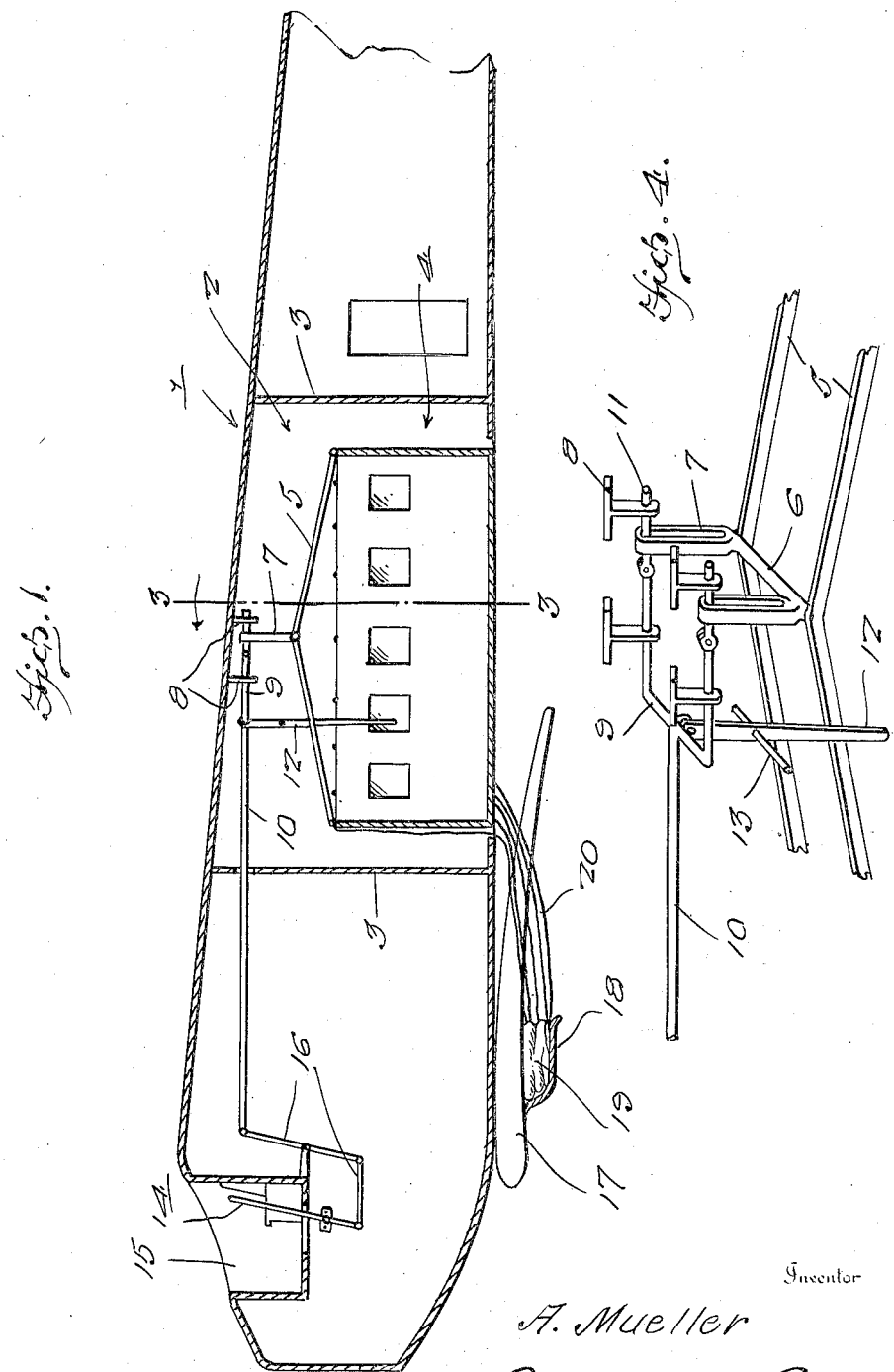

Patented June 11, 1929.

1,716,597

UNITED STATES PATENT OFFICE.

AUGUST MUELLER, OF PITTSBURGH, PENNSYLVANIA.

AIRSHIP.

Application filed August 24, 1925, Serial No. 52,041. Renewed March 12, 1928.

This invention relates to an improved airship, and it has more particular reference to a detachable cabin or compartment for the passengers, together with a parachute for suspending this cabin while descending to the earth.

Briefly, I propose an airship wherein a body is provided and constructed to accommodate a passenger compartment or cabin, this cabin being releasably suspended from the body by means under control of the operator or the occupants of the cabin, there being a parachute which is attached to the cabin and a pocket on the airship for normally accommodating the parachute when not in use.

The features and advantages of the invention will become apparent from the following description and drawings.

In the accompanying drawings forming a part of this specification and in which like numerals are employed to designate like parts throughout the same:

Figure 1 is a sectional view through an airship constructed in accordance with the present invention, showing the cabin in its normal state.

Fig. 2 is a bottom plan view showing the relation of the cabin to the body and wings, together with the pocket in which the parachute is normally housed.

Fig. 3 is a cross section taken approximately upon the plane of the line 3—3 of Fig. 1.

Fig. 4 is a perspective of the releasing means for the cabin.

Referring to the drawings in detail, the reference character 1 designates the body of the airship which may be of an appropriate general contour. In the present instance it is provided with a central compartment 2 defined by partition walls 3 and having an opening in its bottom. A separable or detachable cabin 4 for the passengers is located in this compartment and adapted when released to gravitate through said opening. The cabin is open at its top and provided with appropriate overhead bars 5 connected together by a central cross bar 6. This central cross bar is provided with upstanding vertically elongated loops 7 which are connected with releasable suspension means.

The means is better shown in Fig. 4, wherein it will be seen that it comprises a plurality of hanger brackets 8 attached to the roof of the body, together with a substantially U-shaped member 9 carried by a longitudinally shiftable rod 10. The U-shaped member is provided with hingedly mounted end portions 11 and these together with the arms of the U are slidably engaged with the hanger brackets. It is obvious that when the rod 10 is shifted and the U-shaped member is disengaged or slid through the brackets, the hingedly mounted end portions 11 will be swung down to release the loops 7 and to allow the passenger cabin to descend thru the opening in the bottom of the body.

A hand lever 12 rockably mounted on a horizontal rod 13 is employed for operation by the passengers in the cabin for releasing the latter, while another hand lever 14 is provided in the pit 15 of the forward end of the body to be actuated by the operator ordinarily in this pit. The lever 14 is connected with the rod 10 through the medium of links 16.

The reference character 17 designates a wing or wings on the under side of the body, beneath which is an appropriate open sided pocket 18 in which the parachute or parachutes 19 are folded. A plurality of ropes 20 or their equivalents are connected with the parachute and with the cabin for suspending the cabin in the air in the usual way when it is released.

From the foregoing description and drawing it is obvious that when the member 9 is shifted by actuating either one of the hand levers 12 or 14, the passenger cabin 4 will be released and will drop by gravity down through the opening in the bottom of the body of the airship. After it drops a certain distance it will exert a pull upon the cords 20 and will withdraw the parachute or parachutes from the pocket 18. In a short time the parachute will open up and descend and allow the cabin with the passengers to be transferred slowly to the ground in safety.

A structure of this kind is more particularly useful in cases of emergency and in the event that the engines on the airship become out of order. No doubt, a careful consideration of the description in connection with the drawings will enable persons skilled in the art to which the invention relates to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. An airship comprising a body provided with a cabin compartment having an opening in its bottom, a cabin located in said compartment and gravitationally separable through said opening from the body, releasable suspension means for said cabin, said means operable by a person in the body and also operable by a person in the cabin, a pocket on the underside of the body and open at its side adjacent to the cabin compartment, a parachute in and separable from said pocket through said open side thereof, and flexible connections between the parachute and cabin.

2. An airship comprising a body provided with a cabin compartment open at its bottom, a cabin located in said compartment and movable gravitationally and rectilinearly through the open bottom of the compartment, releasable suspension means for said cabin, said means manually operable, and a parachute carried by and separable from the body and attached to the cabin; the said releasable suspension means for the cabin comprising upstanding loops on the cabin, hangers on the body and having openings, a rectilinearly movable element arranged in bearings on the body and having swingable portions extending through the loops on the cabin and through and detachable from the opening in the hangers on the body, and manually operable means carried by the body and connected with said rectilinearly movable element for the retraction thereof and the release of the cabin.

3. An airship comprising a body or fuselage with an opening in its bottom, and a parachute pocket at the under side of its bottom at one side of said opening, the mouth of said pocket being normally open and disposed toward said opening in the bottom of the body or fuselage, a parachute carried in said pocket of the body or fuselage and withdrawable bodily therefrom, a passenger carrier normally arranged in the body or fuselage and gravitationally movable through said opening in the bottom of the body or fuselage and connected with the parachute, and manually releasable means for detachably securing the carrier in the body or fuselage.

4. An airship comprising a body or fuselage with an opening in its bottom, a wing at the underside of the body or fuselage and a parachute pocket at the under side of the wing and carried thereby, said pocket being disposed at one side of said opening and the mouth of said pocket being toward said opening in the bottom of the body or fuselage, a parachute carried in said pocket and withdrawable therefrom, a passenger carrier normally arranged in the body or fuselage and gravitationally movable through said opening in the bottom of the body or fuselage and connected with the parachute, and manually releasable means for detachably securing the carrier in the body or fuselage; the said wing extending between the mouth of the pocket and the under side of the body or fuselage and to a point below the horizontal plane of the opening in the bottom of the body or fuselage.

5. An airship comprising a body or fuselage with an opening in its bottom and with a parachute pocket at its under side at one side of said opening and with the mouth of the pocket normally open and disposed toward said opening in a bottom of the body or fuselage, a passenger carrier normally arranged in the body or fuselage and gravitationally movable through said opening in the bottom of the body or fuselage, a parachute connected with said carrier and normally arranged in and withdrawable bodily from said pocket, and manually releasable means arranged above the carrier and normally suspending the carrier in the body or fuselage.

In testimony whereof I affix my signature.

AUGUST MUELLER.